No. 897,190. PATENTED AUG. 25, 1908.
J. M. BOYLE.
REINFORCED MONOLITHIC CONDUIT.
APPLICATION FILED FEB. 20, 1907.
2 SHEETS—SHEET 1.
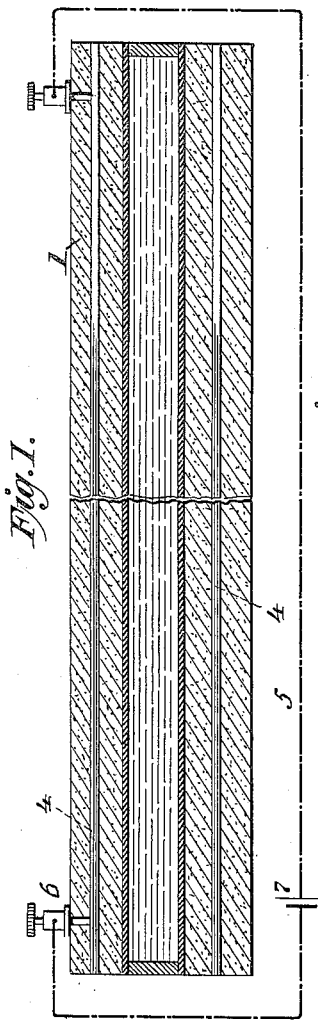
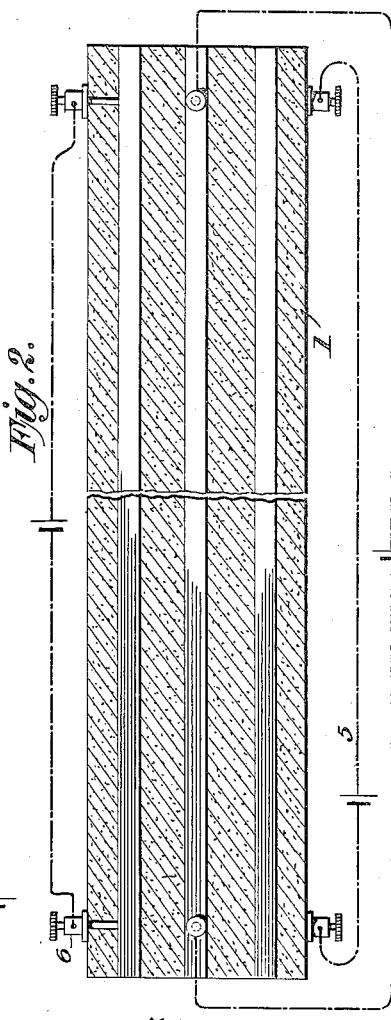
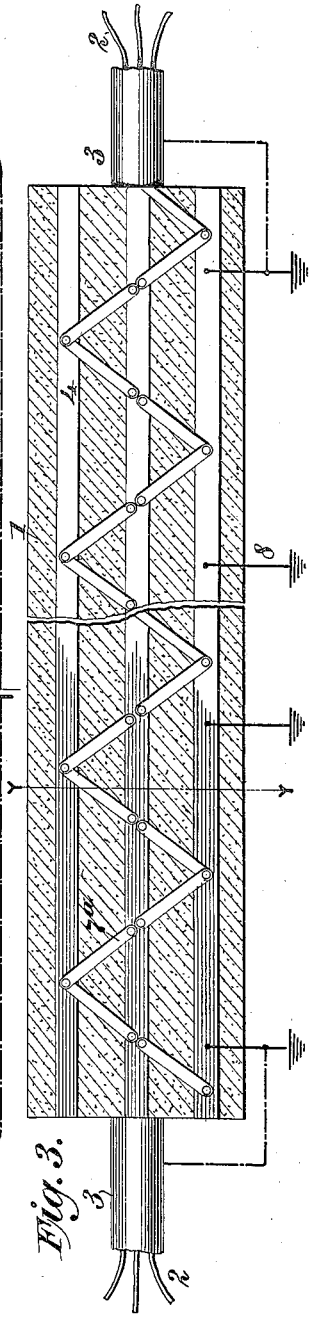
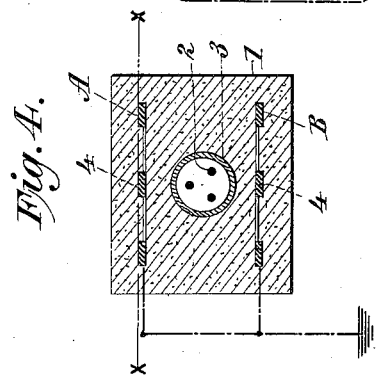
WITNESSES:
Gustave Dieterich
Edwin P. Dietrich
INVENTOR
James M. Boyle
BY Park Benjamin
his ATTORNEY No. 897,190. PATENTED AUG. 25, 1908.
J. M. BOYLE.
REINFORCED MONOLITHIC CONDUIT.
APPLICATION FILED FEB. 20, 1907.
2 SHEETS—SHEET 2.
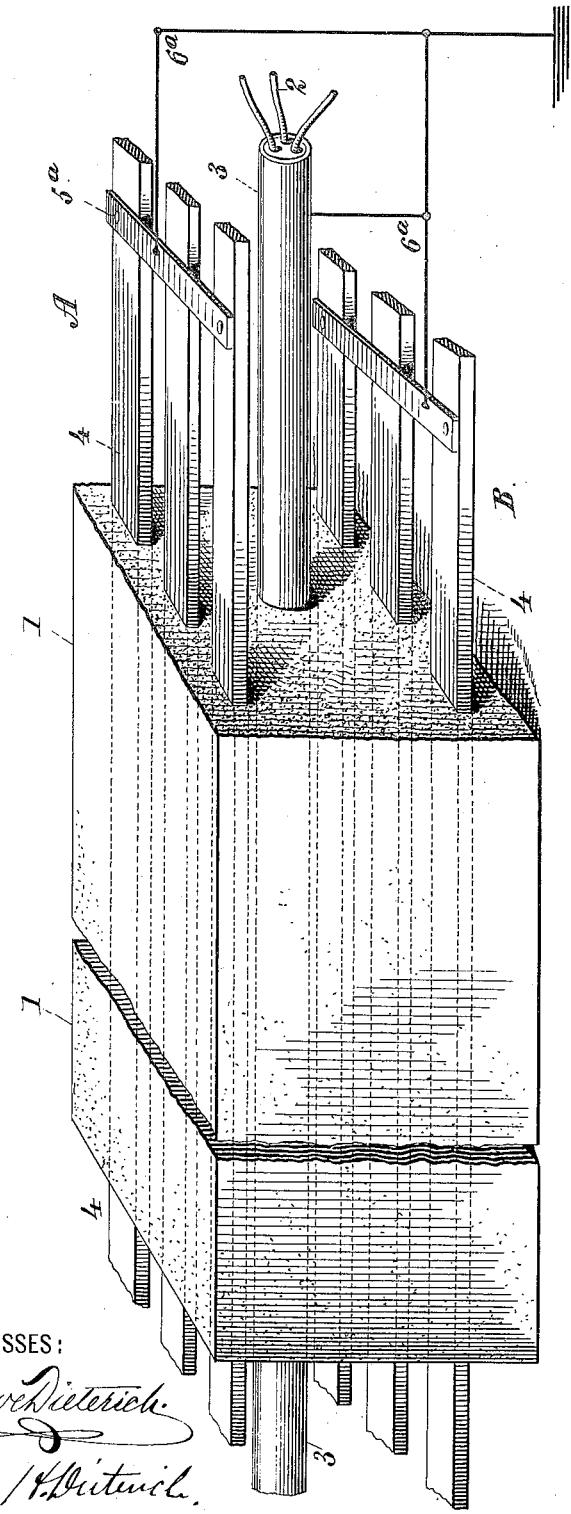
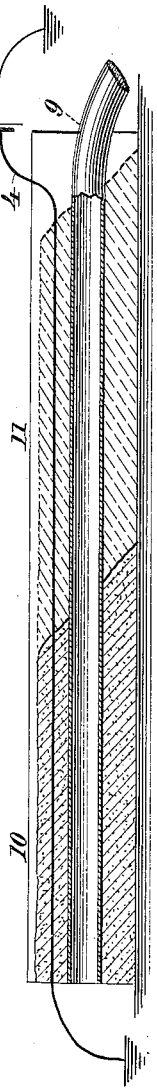
WITNESSES:
Gustave Dieterich
Edwin H. Dieterich
INVENTOR
James M. Boyle
BY Paul Benjamin
his ATTORNEY

UNITED STATES PATENT OFFICE.

JAMES M. BOYLE, OF NEW YORK, N. Y., ASSIGNOR TO MONOLITHIC DUCT COMPANY, A CORPORATION OF NEW YORK.

REINFORCED MONOLITHIC CONDUIT.

No. 897,190.  Specification of Letters Patent.  Patented Aug. 25, 1908.

Application filed February 20, 1907. Serial No. 358,423.

To all whom it may concern:

Be it known that I, JAMES M. BOYLE, a citizen of the United States, residing at New York, in the county of New York and State of New York, have invented a certain new and useful Improvement in Reinforced Monolithic Conduits, of which the following is a specification.

The invention relates to monolithic conduits constructed of plastic cement capable of hardening on setting.

The invention consists in such a conduit provided with reinforcing bodies embedded in its wall which bodies are also electrical conductors and are connected in electrical circuits for any desired purpose, such as the conveyance of current, or, as more particularly hereinafter described, the protection of the sheath of a cable inclosed in said conduit from electro-chemical attack.

In the accompanying drawings—Figure 1 is a vertical longitudinal section of a conduit embodying my invention showing a reinforcing body connected in electrical circuit. Fig. 2 is a horizontal longitudinal section of a similar conduit showing the mutually insulated reinforcing bodies connected in separate circuits. Fig. 3 is a longitudinal section of a conduit embodying my invention, wherein the reinforcing bodies are connected to cable sheath and ground, said section being on the line $xx$ of Fig. 4. Fig. 4 is a cross section on the line $y.y.$ of Fig. 3. Fig. 5 is a perspective view showing the arrangement and connections of reinforcing bodies, cable sheath and ground. Fig. 6 is a vertical longitudinal section of a conduit showing the continuity of the reinforcing bodies from section to section.

Similar numbers of reference indicate like parts.

1 is the conduit preferably made by molding cement or other material capable of hardening upon setting upon a distended flexible core, substantially in the manner set forth in U. S. Letters Patent No. 830,204, granted to me September 6th, 1906. Into the bore of the conduit may be drawn the electrically conducting cable 2, inclosed as usual in a sheath 3 of metal. In the wall of the conduit are embedded elongated bodies of reinforcing material, which is also electrically conductive. In the embodiment of my invention shown in the drawings, the said bodies are flat rods or bars 4, disposed in two groups A, B, respectively on opposite sides of the conduit bore. The material of said reinforcing bodies is to be metal of such strength and proportions as will reinforce and augment the strength of the conduit tube. For electrical purposes the said reinforcing bodies may be utilized as line conductors. Thus as indicated in Fig. 1, the reinforcing body 4 is connected in electrical circuit by means of the connecting wires 5, binding posts 6 on the outside of the conduit and the source of current 7. In Fig. 2, the three reinforcing bodies 4 are each in like manner connected separately in electrical circuit and are mutually insulated by the material of the conduit.

The interior of the conduit may not only be employed to hold an electrical cable or conductor, but for any other desired purpose; as for example, to convey water, gas or oil, or to receive electrically or pneumatically driven cars. In Fig. 1 the interior of the conduit is indicated as conveying a liquid, such as oil or water, and the reinforcing bar 4 is part of an electrical circuit.

In Figs. 3 to 5 inclusive is illustrated a special application of the invention to the protection of the sheath 3, usually of lead, of the cable 2. It is well known that where sheathed cables are carried through iron pipes lined with cement, each length or section of pipe constitutes a collector of stray ground currents which at the most advantageous points within each section are either passed into or taken from the cable sheath through the cement, which is usually more or less damp. The resulting electro-chemical reactions are often disastrous to the sheath.

In my invention the reinforcing bodies are electrically continuous from end to end of the conduit and may be arranged to prevent the foregoing difficulty. Thus in Fig. 5, the bars 4 of the groups A and B are electrically connected by the cross bars $5^a$ and there in turn are connected by wires $6^a$, to one another, to the cable sheath and to ground, thus bringing all to the same potential, and effectually protecting the cable sheath. In the arrangement shown in Figs. 3 and 4, the bars 4 are bonded by cross wires or bars $7^a$ to form a net work, which is electrically connected to the cable sheath and to ground at the ends and which may be connected to ground or other points of low potential at any desired number of points along the length of the conduit as indicated at 8.

In practice the conduit is made in sections, in the place where it is to remain, the sections being formed in suitable molds and around a distensible core 9, Fig. 6. The reinforcing conducting body 4 is then laid and embedded in each section in turn as the sections are successively made. Thus it is first laid and embedded in the first section (10, Fig. 6) and when that section is completed another part of the same body is embedded in the next section 11 and so on continuously from end to end of the entire conduit.

The term "reinforcing material" used in the claims means any material which when embedded in the cement increases the strength of the mass. The term "cement" includes broadly any material which hardens by setting from a plastic state.

I claim:—

1. A continuous monolithic conduit wholly formed of plastic material capable of hardening and molded in its permanent location, having embedded in its material and throughout its length a continuous longitudinal strip of electrically conducting reinforcing material and means for connecting said strip in electrical circuit.

2. A continuous monolithic conduit wholly formed of plastic material capable of hardening and molded in its permanent location, having embedded in its material an electrically conducting cable provided with a metallic sheath and outside of said cable a plurality of continuous longitudinal strips of electrically conducting material and means for electrically connecting said cable sheath and strips to ground.

In testimony whereof I have affixed my signature in presence of two witnesses.

JAMES M. BOYLE.

Witnesses:
WM. H. SIEGMAN,
GERTRUDE T. PORTER.